United States Patent
Kasztenny et al.

(10) Patent No.: US 10,978,866 B2
(45) Date of Patent: Apr. 13, 2021

(54) POLARIZING SIGNAL FOR ELECTRIC POWER DELIVERY SYSTEM PROTECTION

(71) Applicant: Schweitzer Engineering Laboratories, Inc., Pullman, WA (US)

(72) Inventors: Bogdan Z Kasztenny, Markham (CA); Chadburn Troy Daniels, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 174 days.

(21) Appl. No.: 16/453,747

(22) Filed: Jun. 26, 2019

(65) Prior Publication Data
US 2020/0106261 A1    Apr. 2, 2020

Related U.S. Application Data

(60) Provisional application No. 62/740,271, filed on Oct. 2, 2018.

(51) Int. Cl.
| | | |
|---|---|---|
| H02H 3/00 | (2006.01) | |
| H02H 3/18 | (2006.01) | |
| H02H 1/00 | (2006.01) | |

(52) U.S. Cl.
CPC ............ *H02H 3/18* (2013.01); *H02H 1/0061* (2013.01); *H02H 1/0092* (2013.01)

(58) Field of Classification Search
None
See application file for complete search history.

(56) References Cited

U.S. PATENT DOCUMENTS

| | | | |
|---|---|---|---|
| 4,342,064 A | * | 7/1982 | Wilkinson ............ H02H 3/382 361/80 |
| 4,420,788 A | | 12/1983 | Wilkinson |
| 4,686,601 A | * | 8/1987 | Alexander ............ H02H 3/402 361/76 |
| 4,821,137 A | * | 4/1989 | Wilkinson ............ H02H 3/385 361/76 |
| 5,140,492 A | | 8/1992 | Schweitzer |
| 5,367,426 A | | 11/1994 | Schweitzer |
| 5,790,418 A | | 8/1998 | Roberts |
| 6,028,754 A | | 2/2000 | Guzman-Casillas |
| 6,046,895 A | | 4/2000 | Jurisch |
| 6,239,959 B1 | | 5/2001 | Alexander |
| 8,410,785 B2 | | 4/2013 | Calero |
| 8,675,327 B2 | | 3/2014 | Kasztenny |

(Continued)

OTHER PUBLICATIONS

J.G. Andrichak, G.E. Alexander, "Distance Relay Fundamentals" Mar. 2007.

(Continued)

*Primary Examiner* — Stephen W Jackson
(74) *Attorney, Agent, or Firm* — Richard M. Edge (57) ABSTRACT

Polarizing signals for electric power system directional overcurrent and distance protection are disclosed herein. The polarizing signal may be determined using a power system tracking signal, generated using a synchronous reference frame to track to a pre-fault voltage, and maintained using a phase-locked loop. The power system tracking signal may be used for a time after a voltage signal is lost, after which a self-polarizing signal may be used. Where voltage signals are not available, a current may be used to generate the polarizing signal.

25 Claims, 8 Drawing Sheets

(56) References Cited

U.S. PATENT DOCUMENTS

| | | |
|---|---|---|
| 9,257,827 B2 | 2/2016 | Calero |
| 9,941,684 B2 | 4/2018 | Calero |
| 10,114,052 B2 | 10/2018 | Kasztenny |
| 2006/0152866 A1 | 7/2006 | Benmouyal |
| 2008/0239602 A1 | 10/2008 | Kasztenny |

OTHER PUBLICATIONS

Edmund O. Schweitzer III, Bogdan Kasztenny, "Distance Protection: Why Have We Started with a Circle, Does it Matter, and What Else is Out There?" 44th Annual Western Protective Relay Conference, Oct. 2017.

Saeed Golestan, Josep M. Guerrero, "Conventional Synchronous Reference Frame Phase-Locked Loop is an Adaptive Complex Filter" IEEE Transactions on Industrial Electronics, vol. 62, No. 3, Mar. 2015.

Bogdan Kasztenny, Dale Finney, "Fundamentals of Distance Protection" 61st Annual Conference for Protective Relay Engineers, 2008.

\* cited by examiner

POLARIZING SIGNAL FOR ELECTRIC POWER DELIVERY SYSTEM PROTECTION

RELATED APPLICATION

This application claims benefit under 35 U.S.C. § 119(e) to U.S. provisional application Ser. No. 62/740,271 filed on 2 Oct. 2018 titled "Polarizing Signal for Distance and Overcurrent Protection Elements" naming Bogdan Z. Kasztenny and Chadburn Troy Daniels as inventors, which is incorporated herein by reference in its entirety.

TECHNICAL FIELD

This disclosure relates to distance and directional overcurrent protection of electric power delivery systems. More particularly, this disclosure relates to determining a polarizing signal for distance and directional overcurrent protection elements in an electric power delivery system.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Electric power delivery systems are typically monitored and protected by IEDs that obtain voltage and current measurements from the power system. Such IEDs may be configured to provide distance protection, overcurrent protection, and the like such that the IED detects faults only when they occur and signals a protective action (such as a trip command) only when the fault is within a zone of protection of the IED. When using directional protection principles for proper determination of the fault condition for which a trip signal should be issued, the IED relies on valid operating and polarizing signals. Various conditions may introduce errors into the determination of valid polarizing signals such as, for example, very low voltage faults (e.g. bolted faults near the IED), low source inertia, and the like. Improvements to electric power delivery system protection are disclosed herein, using improved polarizing signals for distance and directional overcurrent protection.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Several aspects of the embodiments described may be implemented as software modules or components or elements. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions. Software modules or components may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment.

Figure 1:
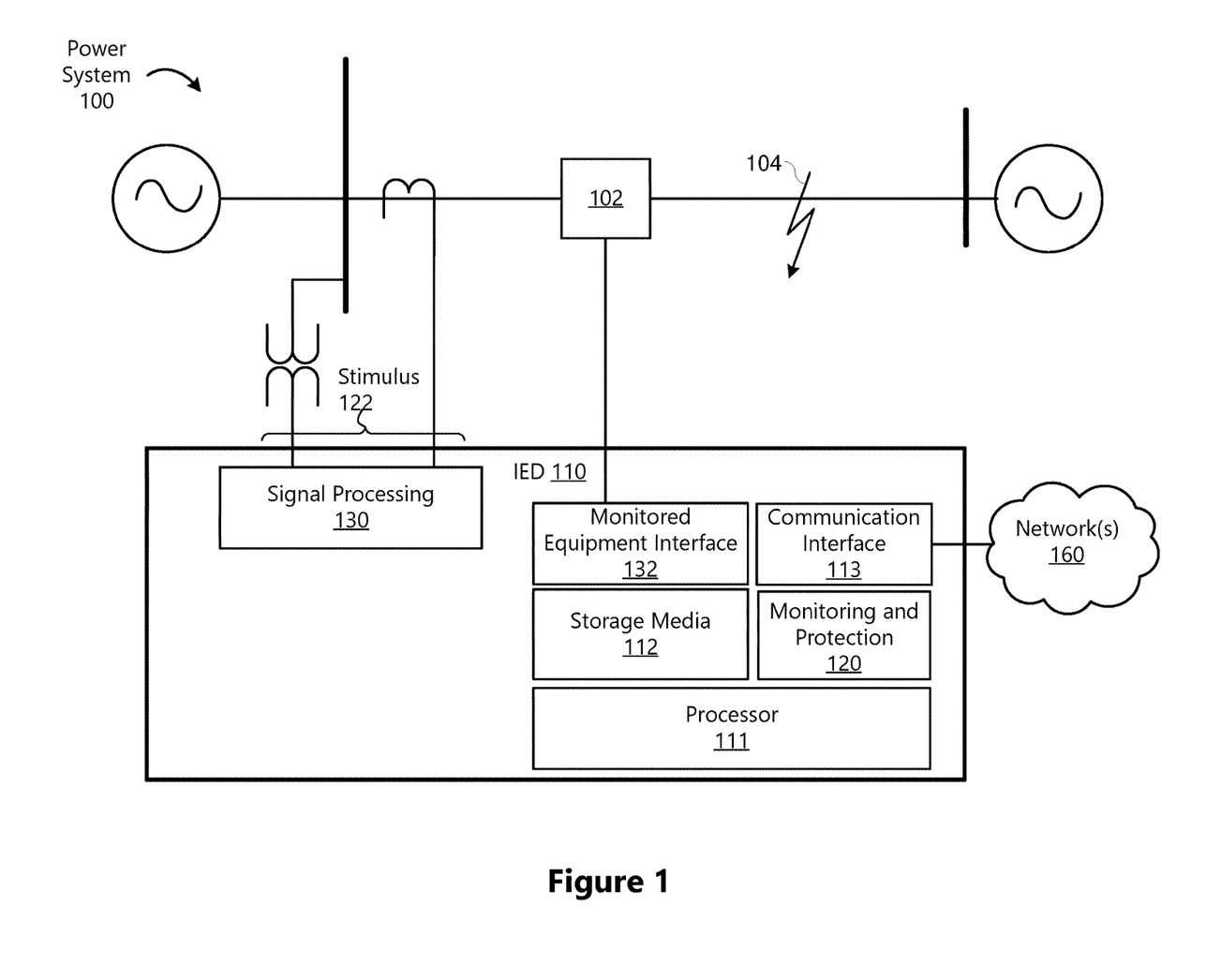
FIG. 1 illustrates a one-line diagram of an electrical power delivery system comprising an Intelligent Electronic Device (IED) implementing electric power delivery system protection in accordance with several embodiments herein.

FIG. 1 illustrates a one-line diagram of an electric power delivery system 100 monitored by an IED 110 that provides electric power system protection such as distance protection, overcurrent protection, and the like. The IED 110 may include a processor 111 for executing computer instructions, which may comprise one or more general purpose processors, special purposes processors, application-specific integrated circuits, programmable logic elements (e.g., FPGAs), or the like. The IED 110 may further comprise non-transitory machine-readable storage media 112, which may include one or more disks, solid-state storage (e.g., Flash memory), optical media, or the like for storing computer instructions, measurements, settings and the like. The IED 110 may be communicatively coupled to one or more networks 160 via one or more communication interfaces 113. The networks 160 may include special-purpose networks for monitoring and/or controlling the electrical power system 100 (e.g., SCADA networks, or the like). The networks 160 may further include general purpose communication networks, such as a TCP/IP network, or the like. The communication interface 113 may include wired and/or wireless communication interfaces (e.g., serial ports, RJ-45, IEEE 802.11 wireless network transceivers, etc.). In some embodiments, the IED 110 may include human-machine interface (HMI) components (not shown), such as a display, input devices, and so on.

The IED 110 may include a plurality of monitoring and protection elements, which may be described as a monitoring and protection module 120 that may be embodied as instructions stored on computer-readable media (such as storage media 112). The instructions, when executed on the processor 111, cause the IED to detect a fault. Upon detecting a fault, the instructions may cause the IED to take actions such as protective actions (signaling a circuit breaker to open the appropriate phases), displaying fault information, sending messages including the fault information, and the like.

The monitoring and protection module 120 may include a directional overcurrent element, a distance element, and the like. To detect the fault 104, the IED calculates polarizing and operating signals in accordance with several embodiments described below, compares the signals, and determines a fault condition. The storage media 112 may include protective action instructions to cause the IED to signal a circuit breaker 102 to open via the monitored equipment interface 132, removing electric power from being fed to the fault upon detecting the fault and fault attributes such as a directional overcurrent condition and distance to the fault.

The IED 110 may obtain electrical signals from the power system 100 through current transformers (CTs) and voltage transformers (PTs), i.e. it may receive stimulus 122 from the power system 100. The stimulus 122 may be received directly via the measurement devices described above and/or indirectly via the communication interface 113 (e.g., from another IED or other monitoring device (not shown) in the electrical power system 100). The stimulus 122 may include, but is not limited to: current measurements, voltage measurements, and the like.

The IED may include a signal processing module 130 to receive the electric power system signals and process the signals for monitoring and protection such as directional overcurrent protection or distance protection. Line currents and voltages may be sampled at a rate suitable for protection, such as in the order of kHz. An analog-to-digital converter (ADC) may create digital representations of the incoming line current and voltage measurements. The output of the ADC may be used in various embodiments herein. As described above, these voltage and current signals may be used to calculate operating and polarizing signals for use in directional overcurrent, distance, and other protection elements. In various embodiments the operating and polarizing signals may be calculated in the signal processing module 130. In other embodiments, the operating and polarizing signals may be calculated using the processor 111.

A monitored equipment interface 132 may be in electrical communication with monitored equipment such as circuit breaker 102. Circuit breaker 102 may be configured to selectively trip or open. The monitored equipment interface 132 may include hardware for providing a signal to the circuit breaker 102 to open and/or close in response to a command from the IED 110. For example, upon detection of a fault, the monitoring and protection module 120 may determine a protective action and effect the protective action on the power system by, for example, signaling the monitored equipment interface 132 to provide an open signal to the appropriate circuit breaker 102. Upon determination of the fault type, the IED 110 may signal other devices (using, for example, the network 160, or signaling another device directly) regarding the fault, which other devices may signal a breaker to open, thus effecting the protective action on the electric power delivery system.

Typical distance protection elements used in electric power system protection include various comparators joined by an AND gate. For example, a quadrilateral distance element may include a reactance comparator, a right blinder comparator, a left blinder comparator, a directional comparator, and/or a phase selection comparator. A mho distance element may include a mho comparator, phase selection comparator, a directional comparator, a reactance comparator and/or a blinder comparator. Distance comparators may be expressed by two signals, namely, an operating signal $S_{OP}$ and a polarizing $S_{POL}$ signal.

Figure 2:
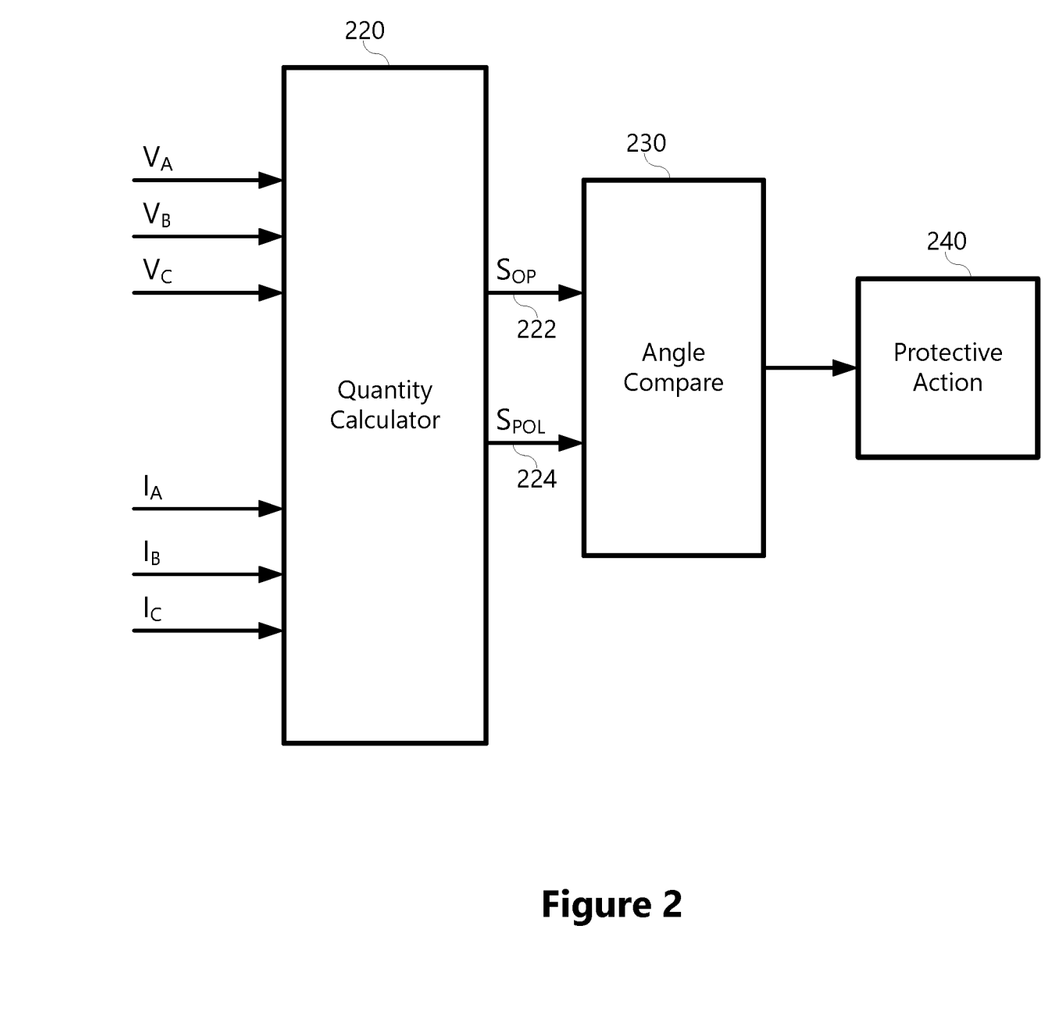
FIG. 2 illustrates a simplified block diagram for electric power system protection using operating and polarizing signals.

FIG. 2 illustrates a functional block diagram using electric power system voltage and/or current inputs to determine a protective action. Three phase voltages $V_A$, $V_B$, and $V_C$ as well as three phase currents $I_A$, $I_B$, and $I_C$ are used in a quantity calculator 220 to calculate the operating $S_{OP}$ 222 and polarizing $S_{POL}$ 224 signals in accordance with the embodiments described below.

In steady states, the operating $S_{OP}$ 222 and polarizing $S_{POL}$ 224 signals are sinewaves. A comparator 230 asserts its output if the operating $S_{OP}$ and polarizing $S_{POL}$ signals are approximately in-phase (and a protective action may then be taken 240), but the comparator 230 keeps its output deasserted if the operating $S_{OP}$ and polarizing $S_{POL}$ signals are approximately out-of-phase. The operating threshold may be around 90 degrees. That is, if the angle between the $S_{OP}$ and $S_{POL}$ is less than 90 degrees in either direction, then the comparator asserts, and if the angle is greater than 90 degrees, the comparator stays deasserted. The threshold may be different than 90 degrees depending on the application.

Operating $S_{OP}$ and polarizing $S_{POL}$ signals may be calculated using voltages and currents from the electric power delivery systems. Equations 1 and 2 may be used to calculate operating and polarizing signals:

$$S_{OP}=Ix \cdot Z_{DIR}$$

or $$S_{OP}=I \cdot Z_R - V \qquad \text{Eq. 1}$$

$$S_{POL}=V_{POL} \qquad \text{Eq. 2}$$

where:

Ix is an operating current such as the phase current, the phase-to-phase current, the negative-sequence current, the zero-sequence current, or the distance loop current;

$Z_{DIR}$ is the unity impedance that decides the maximum torque angle, or the nominal direction of the element for the directional element to assert;

$I \cdot Z_R$ represents a voltage drop across the intended reach impedance $Z_R$ from the current at the relay location I;

V represents a voltage at the relay; and $V_{POL}$ is the voltage polarizing signal.

While the operating signal may be a function of current and/or voltage, the polarizing signal is typically a function of voltage. The polarizing signal may be a polarizing voltage such as, for example, a voltage at the relay (i.e. self-polarized), a healthy phase voltage (i.e. cross-phase polarized), a memorized voltage (i.e. memory polarized), or positive-sequence voltage (i.e. positive-sequence polarized). In instances where the fault voltage at the relay is very low, the voltage signal may be unreliable. For example, low-resistance faults (e.g. metallic faults, bolted faults, and the like) occurring close to the relay would depress the voltage in the faulted phases to a very low value, near zero. Such voltage values may be below the measurement capabilities of the voltage transformer, the control cabling, and/or the relay itself. Without a reliable voltage, the directional comparison may not be reliable, possibly resulting in incorrect directional calculations. As a result, an element (e.g. a mho distance or a directional) loses directional integrity. A forward-looking distance element may misoperate for a reverse fault (loss of security). A reverse-looking distance element may misoperate for a forward fault (loss of security). Moreover, a forward-looking distance element may fail to operate for a forward fault (loss of dependability), and a reverse-looking distance element may fail to operate for a reverse fault (loss of dependability).

The key concern for the polarizing voltage is to ensure correct fault direction reference when the voltage at the relay is very low, below the measurement capabilities of the voltage transformer, control cabling and the relay itself. A low-resistance (metallic fault, bolted fault) fault located very close to the relay would depress the voltage in the faulted phases to a very low value, ideally zero. Such a zero-voltage measurement would occur for a fault in-front of the relay (forward fault) or behind the relay (reverse fault). Without a reliable voltage for the comparison, the current direction cannot be determined.

A mho operating signal for a zero-voltage condition is illustrated in Equation 3:

$$S_{OP} = I^* Z_R - 0 = I^* Z_R \qquad \text{Eq. 3}$$

If the mho element used the voltage at the relay for polarizing, it would work with a zero as shown in Equation 4:

$$S_{POL} = 0 \qquad \text{Eq. 4}$$

In practice, the voltage is not a perfect zero, but it can be so small that its angle is not reliable and prevents the relay from sensing current direction of forward or reverse. As a result, the element (a mho distance or a directional) loses directional integrity. A forward-looking mho distance element may misoperate for a reverse fault (loss of security). A reverse-looking mho distance element may misoperate for a forward fault (loss of security). Moreover, a forward-looking mho distance element may fail to operate for a forward fault (loss of dependability), and a reverse-looking mho distance element may fail to operate for a reverse fault (loss of dependability).

In general, the polarizing signal shall reflect the angular position of a source behind the relay. That source drives the fault current, and comparing the angle of the current and the angle of the source voltage allows the element to tell the forward fault from a reverse fault. In some implementations, a mho element may use "self-polarization" where $S_{POL}=V$. However, when the fault is very close to the relay and the voltage V is too small to provide reliable polarization. Other solutions include:

"Cross-phase" or "quadrature polarization" which use the voltage of the healthy phases. Specifically, a properly shifted VB–VC voltage is used to polarize the AG loop. For a metallic AG fault VA=0, but the VB–VC voltage is large and reliable. Similarly, a properly shifted VA voltage is used to polarize the BC loop. For a metallic BC fault VA–VB=0, but the VA voltage is large and reliable. This method fails for three-phase faults where all three voltages are very low, or zero.

"Positive-sequence polarization" uses the V1 voltage. The V1 signal when measured in reference to phase A applies directly to the AG loop. The V1 voltage is shifted by multiplies of 60 degrees for each of the other five distance loops. This method fails for three-phase faults where all three voltages are very low, or zero.

"Memorized positive-sequence polarization" uses the V1 voltage representing the pre-fault state for polarization. This method may not be accurate where the system changes considerably following the event (e.g. frequency changes).

The very concept of memory polarization assumes that the angle of the pre-fault voltage represents well enough the angle of the source that drives the current during the fault. This assumption holds for a very short period of time at the beginning of the fault. With passing of time, the actual source driving the fault current can move its angular position, while the memorized voltage is static and reflects the steady-state of the system prior to the fault. The $S_{OP}$ and $S_{POL}$ signals in the mho element are typically compared with a 90 degree limit angle. Should the $S_{POL}$ signal move by 90 degrees from the true angular position of the source, the mho element may misoperate. A small frequency difference can result in a large shift between the actual voltage and the memorized voltage if the memory polarization is applied long enough.

In one example, a fast frequency ramp may occur after a close-in reverse bolted three-phase fault. For this fault, the relay may rely on memory for security because the live voltage is zero. The relay locked the memory voltage to the pre-fault frequency and will use that frequency to produce the polarizing signal during the fault. The system frequency during the fault, however, may ramp at a considerable rate (assume rate of change of frequency (ROCOF) of 5 Hz/sec). The operating signal of $S_{OP}=(IZ-V)$ will rotate respective to the locked voltage. When the angle of the polarizing signal is off by 90°, the distance elements are in danger of misoperating. The angle traveled over time t by a system at a given ROCOF value in addition to the angle traveled at the constant frequency is as illustrated in Equation 5:

$$\Delta \alpha = \frac{1}{2}(360^o \cdot ROCOF) \cdot t^2 \qquad \text{Eq. 5}$$

Consider this to better understand equation 5. For a constant ROCOF and the starting frequency $f_0$ the traveled angle in revolutions is $f_0 \cdot t + 0.5 \cdot ROCOF \cdot t^2$. The extra revolutions traveled on top of the $f_0 \cdot t$ revolutions expected if the frequency stayed at $f_0$ are therefore $0.5 \cdot ROCOF \cdot t^2$. Thus, ROCOF of x Hz/s is an acceleration of $\times 360°/s^2$ If we assume 90° as the level of error we must not develop during the memory action for a given ROCOF during a bolted three-phase fault, the maximum duration of memory for ROCOF of 5 Hz/s is 316 ms. For ROCOF of 10 Hz/s the maximum duration is 223 ms. This analysis shows the dangers of keeping memory for a long time, such as to ensure operation of step distance zones. For a memory duration of 2 sec the maximum ROCOF that leads to a 90° angle error is 0.25 Hz/s. This means that if memory is used for 2 sec, the distance element is in danger of misoperating if the system experiences ROCOF of only 0.25 Hz/s.

One possibility for the frequency excursion is when the system truly starts changing its frequency. This is especially pronounced when the system inertia is low, such as in systems with wind or solar generators, or in weak systems with small synchronous generators. Another possibility is when the system frequency does not change, but the relay develops an error when measuring frequency and calculating operating and polarizing signals. Such an error is possible because of the transients that develop during faults. Regardless of the reason, if the system frequency and the relay measured frequency differ, the concept of memory polarization is not robust, and it may lead to distance and directional element misoperation. What is needed is a secure and dependable operating signal.

Past solutions to polarization of distance and directional elements fail to recognize the role of frequency. The old pre-fault value of the voltage angle can serve as a proxy for the angle of the source during the fault, but only if extrapolated (projected forward) at the actual rate of rotation, i.e. the true frequency. However, if the fault voltage is very low or zero, the relay cannot measure frequency from voltages. Frequency measured from current may show considerable errors. Thus, compensation for the difference between the frequency of pre-fault and fault cannot be made easily and accurately. Modern power systems that have lower inertia can exacerbate frequency excursions.

What is needed is an improved polarizing signal $S_{POL}$ for use in power system protection, even when power system voltage is insignificant or when the electric power source has low inertia. Disclosed herein are improvements to electric power system protection using an improved voltage polarizing signal. The improved voltage polarizing signal disclosed herein tracks a positive-sequence voltage, even when the phase voltages are unbalanced or while the frequency changes before and during an event such as a fault. The positive-sequence voltage is used here as a typical application with cross-phase polarizing advantage. Any other signal can be used as well with the other parts of the presented system. For example, a Clarke signal can be used instead of the positive sequence, or any reasonable combination of the three phase voltages. Further, improvements described herein may lock to and follow three-phase voltage with an inertia representative of the generators in the power system. For example, the logic may lock fully within a few hundreds of milliseconds in application to modern power systems. Improvements herein may output the polarizing voltage riding through any sudden jumps in the voltage magnitude or angle due to faults. During faults, improvements described herein may maintain the pre-fault reference and eventually lock to the new reference frame even within a few hundreds of milliseconds. Improvements described herein follow the generator (system) frequency even during faults (using measured frequency), or when free-wheeling upon the total loss of all three voltages (using the last known frequency). Frequency tracking using currents is not required, which is advantageous. Improvements described herein may produce outputs that signify if the synchronous reference is locked, if the polarizing logic is free-wheeling and if it is safe to use the output signal for polarization. Improvements herein described avoid convoluting frequency unnecessarily, do not rely on phasors measured assuming frequency at the time, and do not use frequency to convert rotating phasors into stationary phasors.

Figure 3:
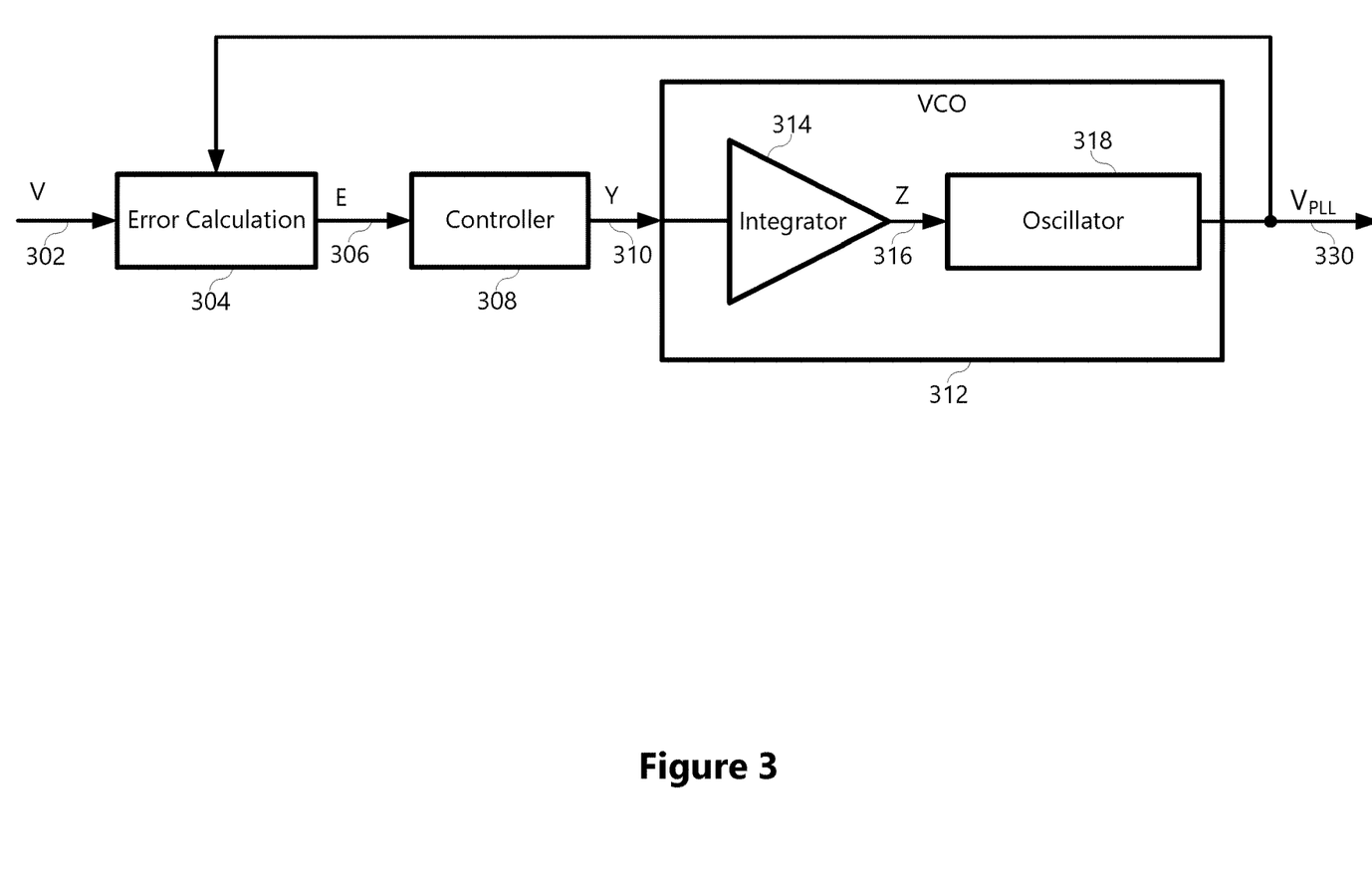
FIG. 3 illustrates a simplified logic diagram of a calculation of a power system tracking signal useful for power system protection.

Embodiments described herein may use a tracking signal locked to a pre-fault power system voltage and output that tracking signal as a reference during fault conditions for use in the polarizing signal. Such tracking locks both the angle and the frequency of the signal. FIG. 3 illustrates a functional block diagram for tracking an AC signal V 302 and outputting a tracking signal $V_{PLL}$ 330. The output tracking signal, $V_{PLL}$ 330 may be generated using a voltage controlled oscillator (VCO) 312. The VCO 312 may include an integrator 314 (Z=integral(Y)) and an oscillator 318. The oscillator 318 may be a sinewave signal generator producing the power system tracking signal $V_{PLL}$ 330 as cos(Z) and/or sin(Z). The input Y 310 may be a control signal when the VCO 312 is implemented in hardware. When the VCO 312 is implemented in software, the signal Y 310 may be a numeric value.

By raising or lowering the control signal Y 310 the tracking signal $V_{PLL}$ 330 output angle is changed correspondingly. Because $V_{PLL}$=cos(Y·t), the signal Y 310 may be referred to as a "frequency". The purpose of the illustrated scheme is to track input V 302 with the signal $V_{PLL}$ 330. The angles of the two signals may be compared 304 to calculate the error E 306. In one embodiment, the error may be calculated such that a positive value means the $V_{PLL}$ 330 needs to move faster to catch up to V 302, and a negative value means $V_{PLL}$ 330 needs to slow down to catch up with V 302.

The controller, (such as a PI controller) uses error E 306 to produce control signal Y 310. When the closed-loop system converges, the $V_{PLL}$ 330 tracks (follows) the input V 302. By adjusting the controller 308 gains, the system can be made to track fast or slow.

Figure 4:
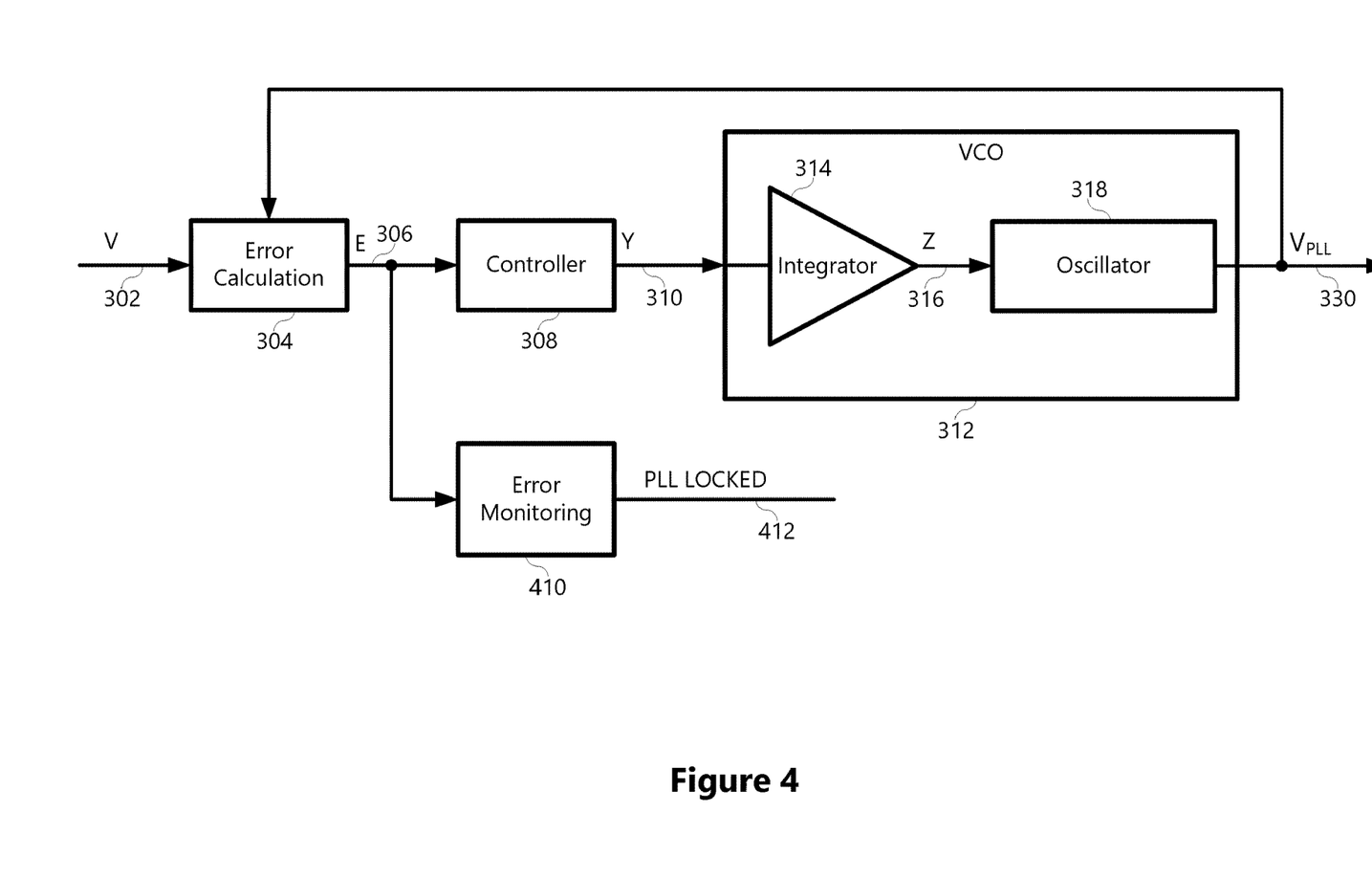
FIG. 4 illustrates a simplified logic diagram of a calculation of a power system tracking signal and assertion of a phase-locked loop (PLL) signal useful for power system protection.

The error signal E 306 may be used to check if $V_{PLL}$ 330 is locked to input V 302 as shown in FIG. 4. Error monitoring 410 may require the error E 306 to be below a predetermined error level for a certain time, before asserting the PLL LOCKED signal 412. The PLL LOCKED signal 412 may be used to control the usage of the tracking signal $V_{PLL}$ 330 for calculating a polarizing signal $S_{POL}$. In some embodiments, if a frequency ramp takes place, the error E 306 will not be zero (the input runs away from the output), and the PLL LOCKED signal 412 will not assert. Thus, the logic is aware through the use of the PLL LOCKED signal that $V_{PLL}$ signal 330 may not be used for polarization when the PLL LOCKED signal is not asserted.

Figure 5:
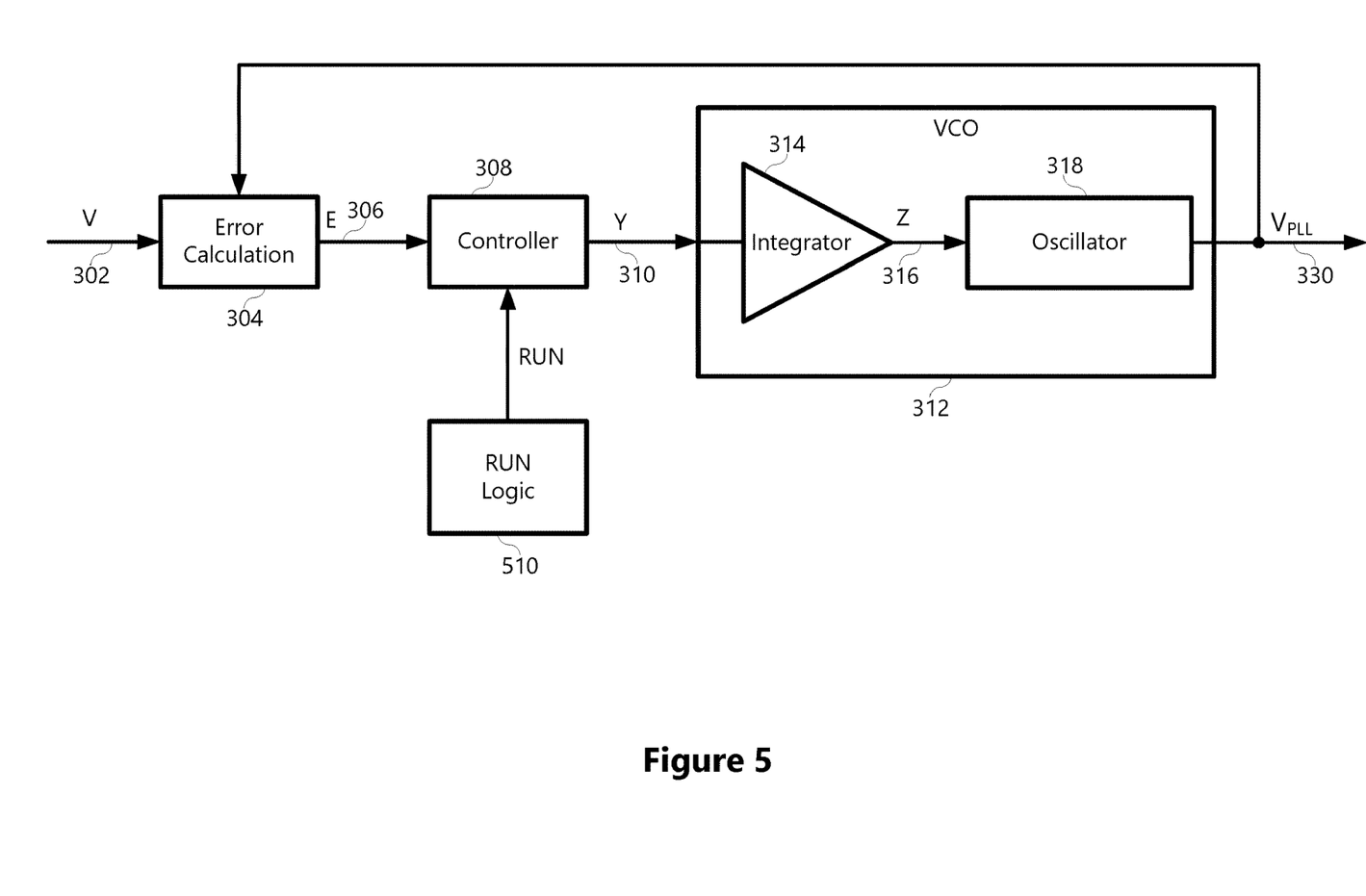
FIG. 5 illustrates a simplified logic diagram of a calculation of a power system tracking signal useful for power system protection enabled using a run signal.

With reference to FIG. 5, several embodiments herein use the run logic 510 to control if the system is allowed to track the input V 302. As illustrated, run logic 510 asserts a RUN signal to controller 308 if it is determined that the method may output a tracking signal $V_{PLL}$ 330. Various conditions may be monitored by the run logic 510. For example, the run logic 510 may not assert the RUN signal when: the input voltage V is too low; when the frequency is not measured by the relay; when the breaker has operated recently (causing one or more poles to open, which generated extra transients, and may force the relay to exclude one or more voltages from the frequency measurement); or when the breaker is open in all three poles and the voltage, if measured on the line side of the breaker, is not representative of the state of the system behind the relay. Various other operating conditions may be monitored by the run logic 510.

When the RUN bit is asserted, the control loop is closed, and the controller adjusts the Y signal 310 based on the E signal 306. When the RUN bit is de-asserted, the Y signal 310 is left at its last value before the RUN signal de-asserted. Using a constant value of Y 310 that is "frozen" is referred here as "free-wheeling". Free-wheeling will take place when the input voltage V 302 is zero (e.g. for a bolted three-phase fault near the relay). Thus, the system projects the tracking signal $V_{PLL}$ 330 consistently with the pre-fault angle and frequency of the input V 302, assuming the signal was locked prior to the fault.

Figure 6:
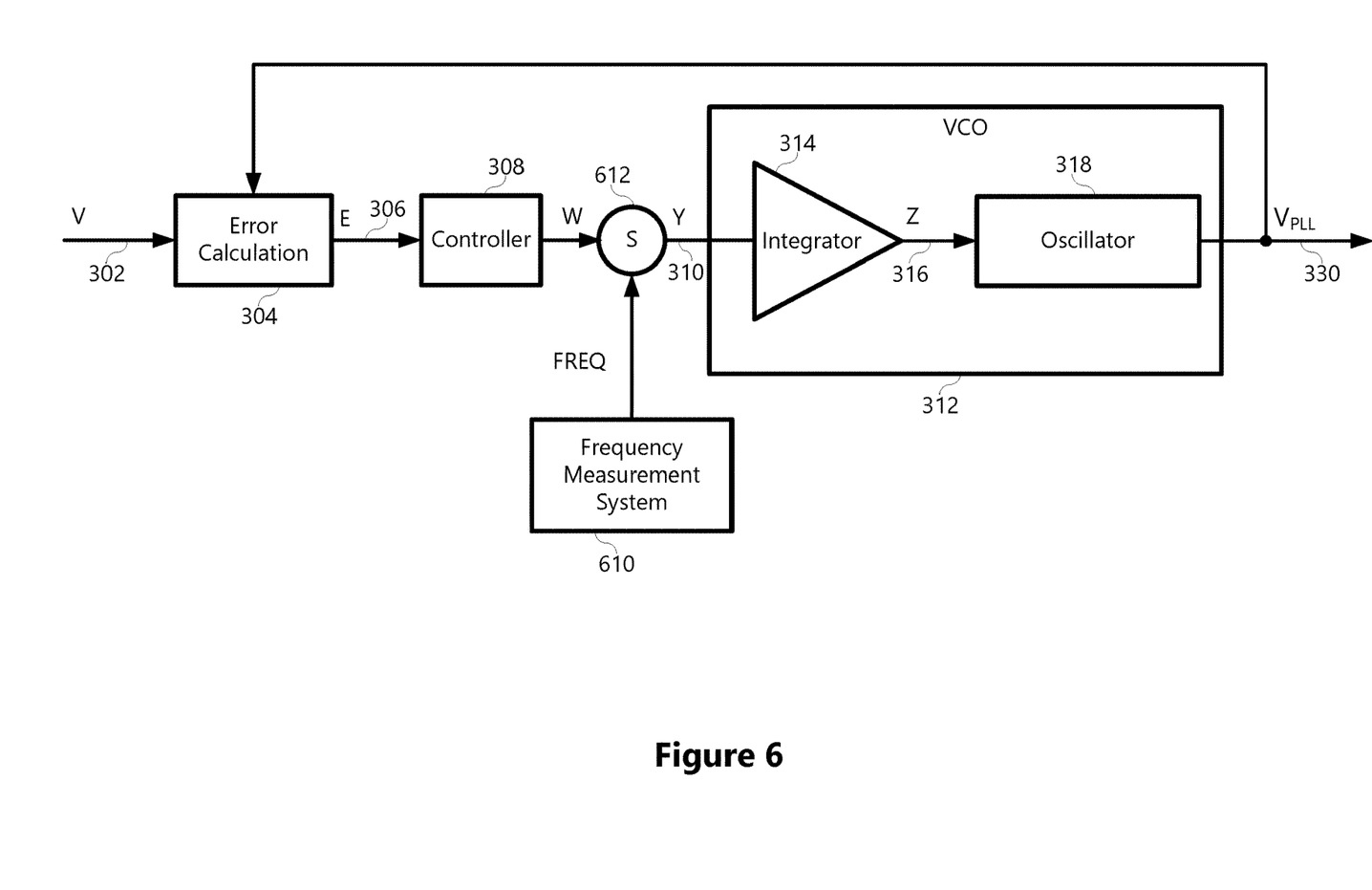
FIG. 6 illustrates a simplified logic diagram of a calculation of a power system tracking signal useful for power system protection using a power system frequency measurement input.

Typically, the frequency measurement methods for protective relay applications are biased for security and prioritize rejection of fault-induced transients over very high accuracy. Various embodiments may use such measured frequency. The controller illustrated in FIG. 3 outputs the phase correction and the frequency blended in its output Y 310. The controller illustrated in FIG. 6 outputs the phase correction and the frequency correction in its output W which is summed 612 with a frequency output from the frequency measurement system 610 of the relay. Typically, the frequency correction will be a small fraction of the frequency and therefore the controller can be optimized for controlling the phase. Should the relay frequency measurement system malfunction, the system in FIG. 6 is able to correct for the frequency error and operate correctly. Accordingly, the embodiment illustrated in FIG. 6 uses the available frequency measurement but operates even if the frequency measurement is not accurate. In one application the frequency input can be fixed at the nominal system frequency instead of being measured by the frequency measuring subsystem.

Figure 7:
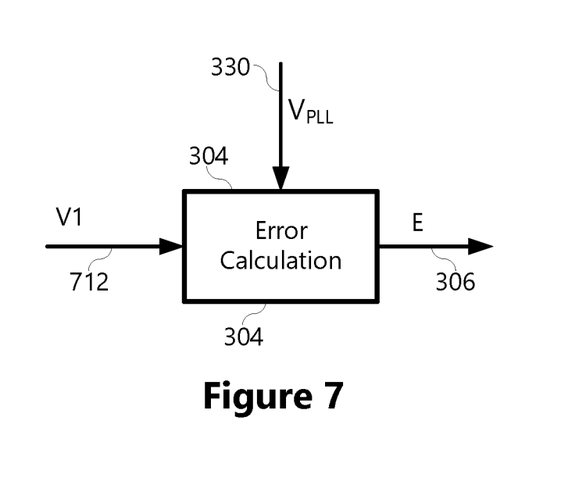
FIG. 7 illustrates a logic diagram useful for error calculation using positive-sequence voltage and a power system tracking signal.

As illustrated in FIG. 7, the positive-sequence voltage V1 712 may be used as an input (V=V1). Positive-sequence voltage V1 is a phasor calculated according to the theory of symmetrical components, while factoring in the single-pole open condition. However, any other reasonable combination of three phase voltages can be used, such as a Clarke component. Several embodiments herein calculate the error E 306 using a phasor of the output tracking signal $V_{PLL}$ 330 (i.e. $V_{PLL}=\cos(Z)+j\cdot\sin(Z)$). The error E 306 may be computed as shown in Equations 6 and 7:

$$AUX = V1 \cdot V_{PLL}^* \qquad \text{Eq. 6}$$

$$E = \frac{imag(AUX)}{\text{abs}(real(AUX))} \qquad \text{Eq. 7}$$

Where * indicates a complex conjugate.

Effectively, the error E 306 per Equations 6 and 7 is a tangent of the angle difference between V1 and $V_{PLL}$. The error is 0 when the two signals are locked perfectly in phase and when they are locked perfectly out of phase. The "abs" operator of Equation 7 makes the "out of phase" equilibrium an unstable one. As a result, the phase-locked loop is in a stable equilibrium only when the two signals are in phase. The value of E 306 is very high when the two signals are about 90 degrees apart. This would lead to an aggressive control action. To prevent such aggressive control action, the E 306 can be limited (clipped) such as to the ±1 range. Alternative measures of error may be used, such as an error proportional to the sine of the angle difference.

Figure 8:
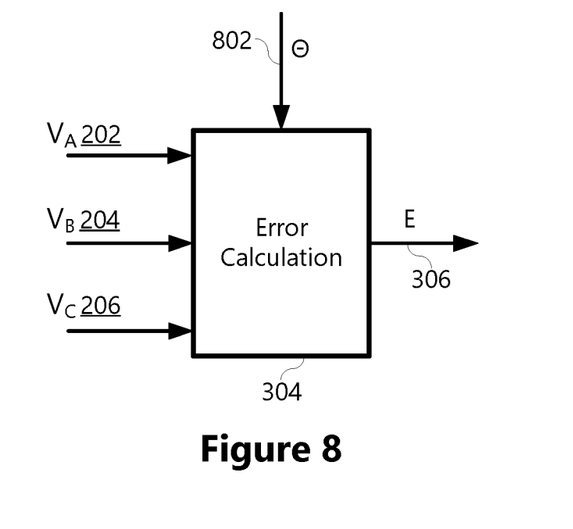
FIG. 8 illustrates a logic diagram useful for error calculation using phase voltages.

An alternative solution to that of FIG. 7 can be used as shown in FIG. 8 which uses instantaneous phase voltages as the input signal. FIG. 8 uses the Park's transform to derive direct (D) and quadrature (Q) components. These D and Q components, when low-pass filtered, represent of the positive-sequence phasor real and imaginary parts as expressed in Equations 8 and 9:

$$v_D = \sqrt{\frac{2}{3}} \left( \cos(\Theta) \cdot v_A + \cos\left(\Theta - \frac{2\pi}{3}\right) \cdot v_B + \cos\left(\Theta + \frac{2\pi}{3}\right) \cdot v_C \right) \qquad \text{Eq. 8}$$

$$v_Q = -\sqrt{\frac{2}{3}} \left( \sin(\Theta) \cdot v_A + \sin\left(\Theta - \frac{2\pi}{3}\right) \cdot v_B + \sin\left(\Theta + \frac{2\pi}{3}\right) \cdot v_C \right) \qquad \text{Eq. 9}$$

where:
$v_A$, $v_B$ and $v_C$ are instantaneous phase voltages;
$\Theta$ is the signal Z in FIG. 3 expressed in radians.

The $v_D$ and $v_Q$ signals of Equations 8 and 9 are low-pass filtered (VD and VQ), and used to calculate the error E 306 as illustrated in Equation 10:

$$E = \frac{VQ}{\text{abs}(VD)} \qquad \text{Eq. 10}$$

References other than the positive-sequence or the Park's transform may be used, such as, for example, the Clarke's transform. This disclosure is not limited to any one way of representing the three-phase power system.

When the input voltage is zero (or below a measuring capability of the system), the system does not have a signal to track, and may free-wheel. However, as explained above, free-wheeling for too long increases the danger of misoperation for elements that use the output of the logic for polarization. A timer may be used to limit the application of the tracking signal $V_{PLL}$ for calculation of the polarizing signal $S_{POL}$ once free-wheeling has started (once the input voltage falls to zero, or low enough that it cannot be reliably measured). The timer (T1) may be on the order of 0.2 sec. When the timer expires, "live" voltage, V1, may be used for calculation of the polarizing signal $S_{POL}$, assuming that voltage is above a predetermined level. Typically, the voltage is above this predetermined level except for three-phase bolted faults very close to the relay location. If the live voltage V1 is too low, current may be used to calculate the polarizing signal $S_{POL}$.

When the current is limited by the system impedance having the angle similar to the line positive-sequence impedance angle, Z1ANG, the current-based polarizing signal is obtained using Equation 11:

$$I1Z=I1*\angle Z1ANG \qquad \text{Eq. 11}$$

When the fault is forward, the polarizing signal may be calculated according to Equation 12:

$$I_{POL}=+I1Z \qquad \text{Eq. 12}$$

When the fault is reverse, the polarizing signal may be calculated according to Equation 13:

$$I_{POL}=-I1Z \qquad \text{Eq. 13}$$

When current-based polarization is needed, the fault direction should be known so that the correct current polarization signal can be selected (either plus or minus). To that end, the initial fault direction may be calculated before the required signals become unavailable. Initial fault direction may be determined using various available methods. In various embodiments, the fault direction is detected by comparing the tracking signal $V_{PLL}$ signal 330 with I1Z. For a forward fault, these two signals are approximately in phase and for a reverse fault these two signals are approximately out of phase. The system may check the angle between I1Z and $V_{PLL}$ during the time that voltage-based signals (e.g. V1 or $V_{PLL}$) are used for polarizing (T1 about 0.2 sec). That is, if V1 is low and I1 is measurable and $V_{PLL}$ is valid, then the $V_{PLL}$ and I1Z may be compared. When the signals are in phase for a time duration (T1, such as 0.1 seconds), the fault is declared as FORWARD; and when out-of-phase for a time duration (T1, such as 0.1 seconds), the fault is declared as REVERSE. Subsequently, if the $V_{PLL}$ is declared as invalid (cannot be kept too long), the V1 level is checked. If V1 is sufficient to provide polarization, V1 is used; otherwise: if the fault was declared FORWARD then +I1Z is used for polarization; and, if the fault was declared REVERSE then –I1Z is used for polarization. Although the current is used, if V1 increases to a level allowing its use for polarization, then the current is no longer used and V1 is used for polarization. According to some embodiments, the current may be used for polarization for a selected time T2, such as 1.5 sec. After that time, the polarization signal is marked as not available and the distance elements may respond as biased permanently forward or reverse, or it may be permanently biased as unavailable as per the designer's (or user's) choice.

Figure 9:
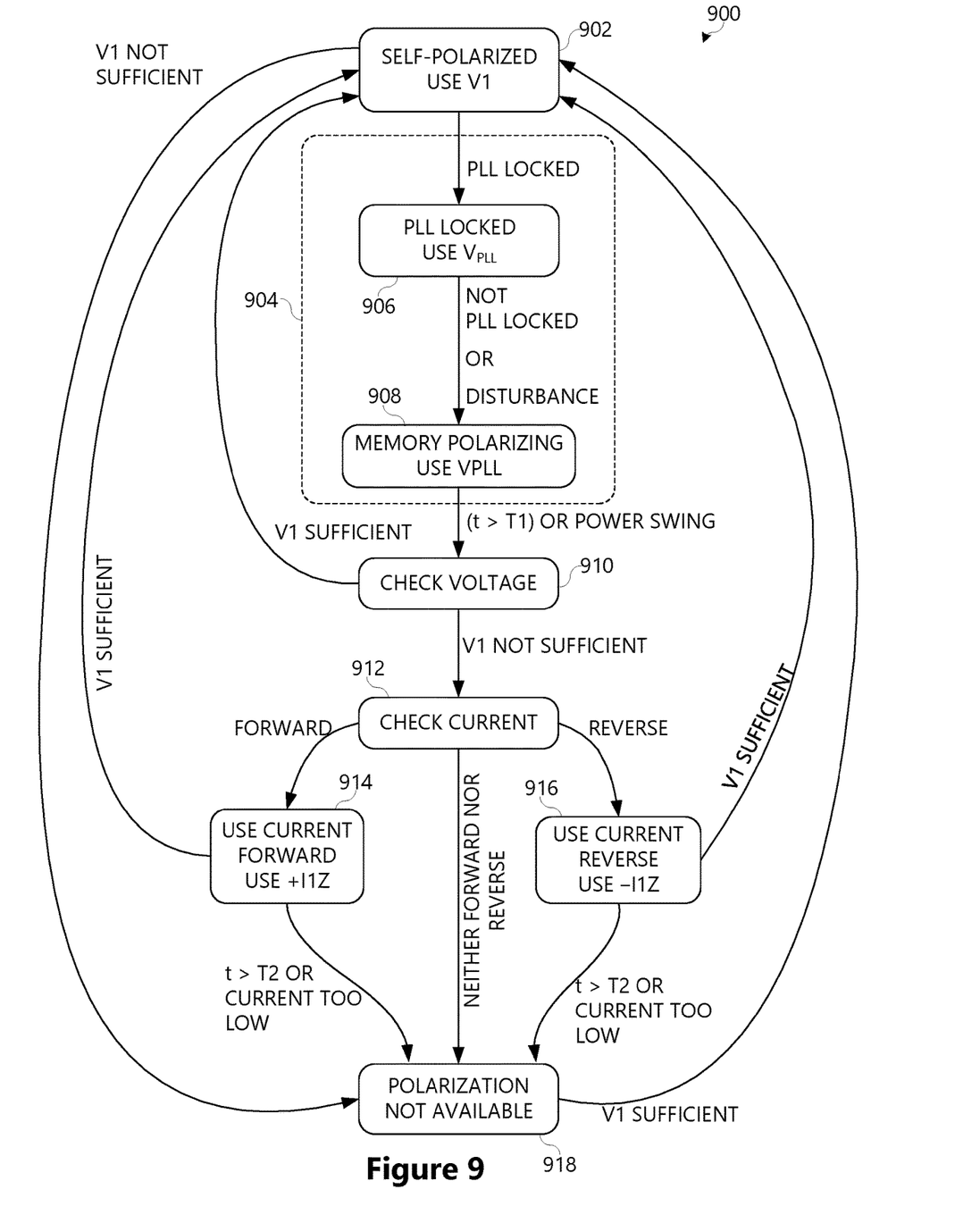
FIG. 9 illustrates a state diagram useful for determining a polarizing signal for power system protection in an electric power delivery system.

Several embodiments herein may be implemented using a state machine to control the way the memorized polarizing signal is established, validated, used, and substituted with live voltage or current. FIG. 9 shows one such state machine 900 for selection of polarizing signals based on the system conditions and sequence of events. At state 902, the system uses V1 for polarization. If the tracking signal $V_{PLL}$ is locked to the input signal (such as V1), then the tracking signal $V_{PLL}$ may be used to generate the polarizing signal 906. Should the tracking signal $V_{PLL}$ become unlocked or a disturbance is detected, then the memory polarizing state 908 is entered. During memory polarizing, the $V_{PLL}$ signal may be used to generate the polarizing signal for a memory period T1 or until a power swing condition is detected, at which time, the voltage is checked 910. For example, when a power swing is detected the memory voltage is not used, as it does not necessarily reflect the angular position of a source that is swinging (changing or oscillating its angular position).

In various embodiments, an alternate signal may be used in place of $V_{PLL}$. To that end, state 904 may be replaced by another alternative polarizing signal state such as, for example, a state where a healthy-phase voltage is used for polarizing.

If the voltage is sufficient (e.g. it exceeds a predetermined voltage threshold) at 910, then the self-polarizing state 902 may be entered where a self-polarizing signal such as V1 may be used to generate the polarizing signal. Otherwise at 910, a current check 912 may lead to use of forward fault current signals 914 or reverse fault current signals 916 being used to generate the polarizing signal as described above. If neither forward nor reverse fault has been or may be determined, then polarization may not be available 918. At any time during states 914, 916, or 918, if the voltage signal becomes sufficient (exceeds the voltage threshold), then the self-polarizing state 902 may be entered.

When a line is initially energized, the pre-energization voltage measured by the relay may be zero. Consequently, that pre-energization voltage cannot be used for polarization. For a short period of time following energization, the line may be protected using switch onto a fault (SOTF) logic that does not require polarization. SOTF logic typically ends in about 0.2 sec if the energized line is not faulted. From that time on the line should be protected by regular protection such as distance elements. For regular protection, the polarizing signal should be established shortly after line energization. However, if the gain of the controller in FIGS. 3-6 is intentionally small to provide some intentional inertia to the $V_{PLL}$, it may take a relatively long time to lock. Thus, what is needed and disclosed below is a quick start up mode for the polarizing logic.

A transition from a long lasting "no-voltage" state (several seconds) to a "normal voltage" state is detected. The live voltage V1 and the signal frequency are obtained and validated. If the signals are valid, the Z 316, Y 310, and, when necessary W variables may be calculated as illustrated in Equations 14-16:

$$Z = \angle V1 \qquad \text{Eq. 14}$$

$$Y = 2*\pi*\text{FREQ} \qquad \text{Eq. 15}$$

$$W = 0 \qquad \text{Eq. 16}$$

Depending on the type of the controller used, its internal states are forced to be consistent with the E=0 input and the W=0 output. The quick-start may be a one-time operation to initialize the controller to very close to the equilibrium to speed up assertion of the PLL LOCKED signal 412.

Embodiments herein may be used with inverter-based sources. A typical inverter-based source such as a solar-powered source or some wind-powered sources track the AC grid and provide synchronization of the DC/AC conversion process in the inverter using a controller with set gains. Embodiments herein may use controller gains and other options as discussed above that are selected to match the source (e.g. calculated using the source controller gains and other attributes of the source controller) to provide an improved polarizing signal for relays in the vicinity of the inverter-based source.

While specific embodiments and applications of the disclosure have been illustrated and described, it is to be understood that the disclosure is not limited to the precise configurations and components disclosed herein. Moreover, principles described herein may also be utilized for distance protection and directional overcurrent protection. Accordingly, many changes may be made to the details of the above-described embodiments without departing from the underlying principles of this disclosure. The scope of the present invention should, therefore, be determined only by the following claims.

What is claimed is:

1. An electric power delivery system protection system, comprising:
   a signal processor to:
      obtain electric power delivery system signals;
      calculate multi-phase voltage from the electric power delivery system signals;
      generate a control signal using a controller with a predetermined gain;
      generate a power system tracking signal using the control signal, where the control signal is calculated using the multi-phase voltage and the power system tracking signal; and,
   a protection element to
      calculate a polarizing signal using the generated power system tracking signal;
      calculate an operating signal using the electric power delivery system signals;
      determine a phase difference between the polarizing signal and the operating signal; and
      assert a protective action when the phase difference is below an operating threshold.

2. The system of claim 1, wherein the multi-phase voltage comprises positive-sequence voltage.

3. The system of claim 1, wherein the power system tracking signal is generated using a voltage-controlled oscillator.

4. The system of claim 1, wherein the power system tracking signal is generated using an integrator and a sinewave signal generator.

5. The system of claim 1, wherein the signal processor is further configured to calculate an error signal as a difference between the multi-phase voltage and the power system tracking signal.

6. The system of claim 5, wherein the signal processor is further configured to determine a locked condition of the power system tracking signal using the error signal, and asserting a locked signal when the locked condition is determined.

7. The system of claim 6, wherein the protection element calculates the polarizing signal using the generated power system tracking signal during locked condition of the power system tracking signal.

8. The system of claim 7, wherein the protection element calculates the polarizing signal using the multi-phase voltage when the locked signal is not asserted.

9. The system of claim 7, wherein the protection element calculates the polarizing signal from of the electric power delivery system signals after a locked signal is not asserted for a predetermined time.

10. The system of claim 1, wherein the multi-phase voltage comprises instantaneous voltages from each phase of the electric power delivery system.

11. The system of claim 10, wherein the signal processor is further configured to calculate an error signal using the instantaneous voltages and an integrated control signal.

12. The system of claim 1, wherein the signal processor is configured to generate the power system tracking signal using the control signal and a measured electric power system frequency.

13. The system of claim 1, wherein:
the signal processor is further configured to compare the multi-phase voltage with a predetermined voltage threshold; and,
when the multi-phase voltage is below the predetermined voltage threshold, the protection element is configured to calculate the polarizing signal using a multi-phase current signal from the electric power delivery system signals.

14. The system of claim 13, wherein the polarizing signal comprises a positive-sequence current shifted by the positive-sequence impedance angle.

15. The system of claim 14, wherein a sign of the positive-sequence current comprises positive for forward faults and negative for reverse faults.

16. The system of claim 1, wherein the signal processor is further configured to:
determine a line energization condition;
when a line energization condition is determined initialize the power system tracking signal using a frequency of the electric power delivery system signals and a positive-sequence voltage angle of the electric power delivery system signals.

17. The system of claim 1, wherein the polarizing signal is calculated using electric power delivery system signals and not the power system tracking signal when:
the multi-phase voltage is above a predetermined threshold;
a frequency of the electric power delivery system signal is measured; and,
each phase of the electric power delivery system is closed.

18. The system of claim 1, wherein the protection element further comprises a state selector configured to determine a polarizing signal calculation using electric power delivery system signals.

19. The system of claim 18, wherein the state selector is configured to determine a polarizing signal calculation using electric power delivery system current signals when voltage signals are below a predetermined voltage threshold.

20. The system of claim 18, wherein the state selector is configured to determine a polarizing signal calculation using electric power delivery system voltage signals when the power system tracking signal is not in a locked condition.

21. The system of claim 1, wherein the predetermined gain is calculated using attributes of an electric power source connected to the electric power delivery system.

22. A protection element for an electric power delivery system, comprising:
a power system tracking signal generator including an integrator and an oscillator to output the tracking signal as an oscillating signal generated using an output of the integrator;
an error calculator to calculate an error between the tracking signal and a multi-phase voltage from the electric power delivery system;
a control signal generator in communication with the error calculator to provide a control signal to the integrator using the error; and
a comparator to output a protective action signal when a phase difference between an operating signal calculated from electric power delivery system signals and a polarizing signal calculated using the tracking signal is below a predetermined threshold.

23. An electric power delivery system protection system, comprising:
a protection element to output a protective action signal when a phase difference between an operating signal and a polarizing signal is below a predetermined threshold; and
a state selector to select a polarizing signal:
as a tracking signal calculated using a multi-phase voltage from voltage signals of the electric power delivery system when the multi-phase voltage exceeds a predetermined threshold and the tracking signal is in a locked state; and
as a multi-phase voltage of the electric power delivery system when the multi-phase voltage signal exceeds the predetermined threshold and the tracking signal is not in a locked state.

24. The protection system of claim 23, wherein the state selector is further configured to select the polarizing signal as a shift of a current by the angle of a line impedance when the multi-phase voltage does not exceed the predetermined threshold.

25. The protection system of claim 23, wherein the state selector is further configured to select the polarizing signal as the multi-phase voltage when the multi-phase voltage signal exceeds the predetermined threshold after the tracking signal is not in a locked state for a predetermined time.

* * * * *